US006977663B2

(12) United States Patent
Chang

(10) Patent No.: US 6,977,663 B2
(45) Date of Patent: Dec. 20, 2005

(54) COLOR ERROR DIFFUSION WITH COLOR BLEED CONTROL

(75) Inventor: Ching-Wei Chang, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 8 days.

(21) Appl. No.: 10/812,750

(22) Filed: Mar. 29, 2004

(65) Prior Publication Data
US 2005/0212816 A1 Sep. 29, 2005

(51) Int. Cl.[7] .................. G09G 5/00; G06K 9/40; H04N 1/405
(52) U.S. Cl. ............... 345/596; 382/266; 358/3.03
(58) Field of Search ............... 358/1.9, 3.03, 358/3.04, 465; 345/596–597, 601; 382/266, 382/167

(56) References Cited

U.S. PATENT DOCUMENTS

| | | | | |
|---|---|---|---|---|
| 5,070,413 A | * | 12/1991 | Sullivan et al. | 358/3.03 |
| 5,130,823 A | * | 7/1992 | Bowers | 358/465 |
| 5,218,671 A | * | 6/1993 | Liao et al. | 345/595 |
| 5,455,600 A | * | 10/1995 | Friedman et al. | 345/597 |
| 5,561,751 A | | 10/1996 | Wong | |
| 5,621,545 A | | 4/1997 | Motta et al. | |
| 5,621,546 A | | 4/1997 | Klassen et al. | |
| 5,767,876 A | | 6/1998 | Koike et al. | |
| 5,835,238 A | * | 11/1998 | Mantell | 358/3.03 |
| 5,861,896 A | | 1/1999 | Barton et al. | |
| 5,929,874 A | | 7/1999 | Barton et al. | |
| 6,011,540 A | * | 1/2000 | Berlin et al. | 345/601 |
| 6,072,591 A | | 6/2000 | Harington | |
| 6,178,008 B1 | | 1/2001 | Bockman et al. | |
| 6,270,186 B1 | * | 8/2001 | Smith et al. | 347/41 |
| 6,271,936 B1 | | 8/2001 | Yu et al. | |
| 6,483,606 B1 | | 11/2002 | Klassen et al. | |
| 6,535,635 B1 | | 3/2003 | Kalssen et al. | |
| 6,707,576 B1 | * | 3/2004 | Chang | 358/1.9 |
| 6,753,978 B1 | * | 6/2004 | Chang | 358/3.04 |
| 6,798,537 B1 | * | 9/2004 | Lau et al. | 358/1.9 |
| 2003/0038953 A1 | * | 2/2003 | Damera-Venkata | 358/1.9 |

FOREIGN PATENT DOCUMENTS

JP 9-307776 11/1997

* cited by examiner

Primary Examiner—Matthew C. Bella
Assistant Examiner—Anthony J. Blackman
(74) Attorney, Agent, or Firm—Jon M. Dickinson, PC; Robert D. Varitz, PC

(57) ABSTRACT

A method for controlling color bleed in relation to a system-invoked halftone color-image process which involves and includes the practice of error diffusion. The proposed method involves (a) selecting a location in the system which is downstream therein relative to where error diffusion takes place, (b) at that location, performing diffusion-accumulated error calculation, (c) at another location in the system which is downstream from where error calculation takes place, applying error filtering to define a numerically weighted pixel-neighbor distribution pattern for such calculated accumulated error, where the numbers associated with that pattern add to a defined distribution-weight totality number, and (d) then preparing, for use in a next-pixel error-diffusion event, a chosen distribution-weight totality number which is less than the defined distribution-weight totality number.

10 Claims, 2 Drawing Sheets

COLOR ERROR DIFFUSION WITH COLOR BLEED CONTROL

BACKGROUND AND SUMMARY OF THE INVENTION

This invention pertains to an improved method for controlling color bleed in a color-image processing setting of the category wherein color error diffusion is performed with respect to an output imaging device, such as a printer. In particular this invention relates to such a setting in which the output device is a bi-tonal device that effects (prints, in the case of a printer) bi-tonal color images in a defined color space. The output color space of such device is referred to herein as a device output color space, and a preferred and best-mode manner of implementing the invention is illustrated and described herein representationally with regard to a halftone color printer which operates in C, M, Y, K color space. Additionally, while it will become readily apparent that the present invention can be invoked with significant utility in a setting wherein any form of color error diffusion takes place, the mentioned preferred manner of practicing the invention has special utility where color vector error diffusion is the type of diffusion which is performed, and thus, the invention is specifically described herein in such an environment.

Color bleed, or bleeding, is a common problem in color-image processes which involve color error diffusion. If, in an image, there is a very similar color throughout a local region, sometimes the accumulated color error which arises in the context of error diffusion cannot be digested in this region, and this situation can lead to color bleeding to a next-adjacent color region, and thereby produce a dramatic and unwanted mix of color in that region. While color bleeding can sometimes be a problem in approaches which do not use vector color error diffusion, color bleeding can become especially severe, and very unacceptable, in the case of vector color error diffusion of the kind that uses a device-independent color space for halftone input space, and which combines that practice with the additional practice of performing device color-conversion in the dithering process.

The typical prior art approach used to minimize color bleeding employs pre-adjustment with respect to the input data image. That approach requires an extra processing step for implementing error diffusion, and given this, and with regard to the issue of efficiency of performance, the approach is not optimal. The present invention disclosed herein uses a simple and efficient method to avoid color bleeding, and implements this method in a manner which not only essentially completely obviates the color-bleeding problem, but also optimizes the efficiency of performance.

Accordingly, the present invention, to address the color-bleed issue, takes the unique, simple and extremely effective approach of utilizing only a portion (a reduction), rather than the whole, of an accumulated diffusion error amount, and applies this reduction in accordance, as will be described, with the specific nature of an employed error diffusion filter. In implementing this practice of the invention, I have found that it is preferable, where possible, to base the proposed reduction amount of distributed accumulated diffusion error on a practice using a "power-of-2" approach which neatly fits into the otherwise conventional bit-wise character of the normal digital-computer world, and which allows a selected reduction to be handled very simply by the conventional operation of a shift register. I have also determined that, while various different kinds of diffusion error filters may be employed, and several are specifically described herein, an especially satisfactory filter for most applications is the well-known Floyd and Steinberg filter. I have further determined that a very satisfactory, and indeed a preferred, proportion of the total calculated accumulated diffusion error to use is $15/16$. Other proportions can, of course, be chosen, but this particular one appears to provide the most strikingly appealing results. It turns out that this proportion not only works very well, but also (a) readily enables the "power-of-2" approach mentioned above, and (b) fits extremely well, as will be seen in the discussion below, in a situation where a Floyd and Steinberg filter is employed.

No matter what filter is employed, and no matter what specific character of error diffusion is used, color bleed can be substantially fully eliminated by the described practice of the present invention—a practice involving intentional use of some proportioned amount which is less than the full calculated amount of diffusion error in each instance involving pixel distribution of such error.

These and various other features and advantages which are attained by practice of the invention will become more fully apparent as the detailed description which now follows is read in conjunction with the accompanying drawings.

DETAILED DESCRIPTION OF THE INVENTION

Figure 1:
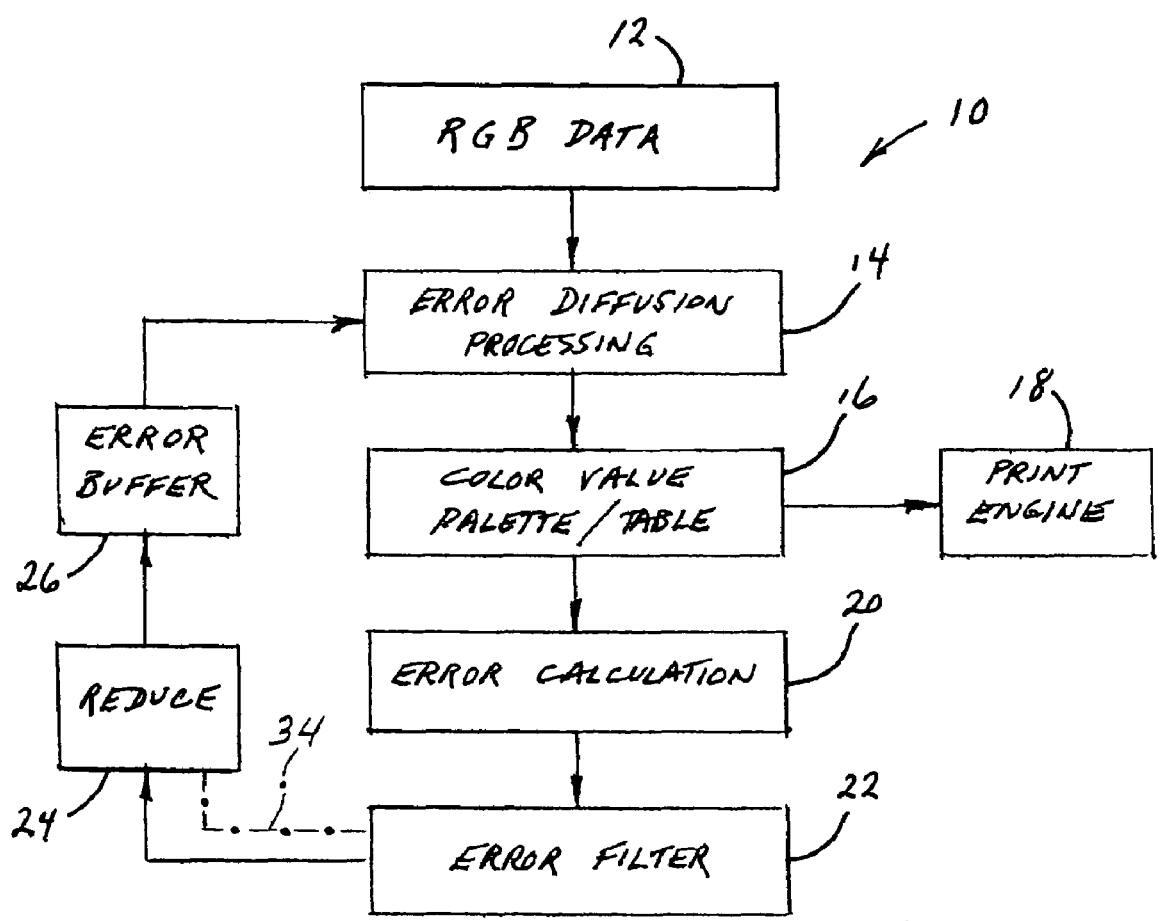
FIG. 1 is a block/schematic drawing illustrating the structural and methodological architecture of the invention.

Turning now to the drawings, the methodology and system architecture of a preferred and best-mode embodiment of, and manner of practicing, the invention are shown generally at 10 in FIG. 1. Principally using the methodological characteristics of the invention from now on in this descriptive narrative, FIG. 10 is seen to include eight representative blocks 12, 14, 16, 18, 20, 22, 24, 26 interconnected by the various single-headed arrows which appear in the figure. As mentioned earlier herein, the method of the invention can be employed selectively in different color spaces, and with different styles of color error diffusion. For the purposes of illustration and description herein, the invention will be explained in a setting which involves R, G, B input color space, and wherein the kind of color error diffusion which is employed is vector error diffusion.

Thus, block 12 represents an "input" color-image file made up of R, G, B color-space pixel data which is fed to block 14 for vector error-diffusion processing. In block 14, previously calculated and "prepared", accumulated R, G, B error is appropriately and conventionally applied to the respective R, G, B values of an incoming R, G, B pixel, and this accumulated error-adjusted pixel then "flows" to block 16 which includes, as an illustration, a look-up table-type color palette which is suitably constructed whereby, through the utilization of any appropriate form of vector color-distance calculation, an operation takes place to select the best set of pixel output values to feed to a color-image output device, such as a C, M, Y, K color-space halftone printer, or print engine, 18. Proper color-space conversion from R, G, B to C, M, Y, K takes place in the operation of the color palette in block 16.

Progressing from block 16 downwardly in FIG. 1, the same R, G, B pixel values for each pixel which has triggered the operation of block 16, are passed to error calculation block 20, wherein diffusion errors are calculated so as to be readied for application to a subsequent R, G, B pixel which "enters the scene".

Inside of block 16 sits a relational color palette which may have been prepared, and preferably has been prepared, in what can be thought of as a device-specific manner relative to printer 18. Such a palette would typically include a determined listing of specific R, G, B pixel values which directly relate to the specific C, M, Y, K primary and secondary colors which can be output (printed) by printer 18.

Such a table might typically have been prepared by pre-operating printer 18 to print individually all of its several possible halftone output colors, with spectrophotometric readings then taken of those actual printed colors to determine the proper, related R, G, B color-space pixel values.

With such a palette in place, the vector color-distance calculation mentioned above, which is a conventional calculation, looks to find in the palette the R, G, B table-values which have the closest color distance to those of the R, G, B pixel which has "arrived" from block 14. Once this "color-closest" set of pixel values has been identified, the error calculation also mentioned above takes place to determine the R, G, B value differences that exist between those values which are associated with the finally selected output pixel, and those which are associated with received R, G, B pixel which led to the just-completed color-distance calculation. These differences (R, G, B error values) are then fed to an error diffusion filter which is represented by block 22 in FIG. 1. Diffusion error calculation, and subsequent operation of whatever filter occupies block 22, take place on a color-space-value by color-space-value basis. In other words, R error values are calculated and treated by the filter as R values, G error values are also so handled, and the same is true for B error values.

An actual numerical example will be helpful here to illustrate the above several procedures. This example will be described in terms of a single R, G, B pixel, and even more specifically in terms of the R color-space component of that pixel.

Let us assume that the input R, G, B pixel which has just arrived for processing at block 16 has an accumulated R value of 132, and that the calculated closest-distance output pixel in the color palette has an R value of 100. In such a case the calculated R error will be 132−100=32. This error value, 32, is, then, the R error for the "current" pixel, which error is passed along to the error diffusion filter in block 22. In the absence of the presence of the invention which is the subject of this disclosure, the filter in block 22 would operate in a generally well-known and normal manner, and in accordance with its prescribed filter characteristics, to pass this error along directly to error buffer block 26, from where newly accumulated errors are applied to successive new arriving R, G, B image pixels.

However, according to practice of the present invention, that is not what occurs.

Before going further in the comparative discussion regarding what would "normally" happen but does not because of the special intercession of the present invention, let us turn attention to a completion of a general description of what remains to be described in the drawings. In the preferred implementation of this invention, the error filter in block 22 takes the form of the well-known Lloyd and Steinberg filter which is shown at 28 in FIG. 2, and which has the particular diffusion, or error, distribution pattern that is numerically indicated in FIG. 2. Here, a five-member pixel pattern is shown, with the letter X marking what can be referred to in each operation of the filter as the representative "neighborhood" position of the current pixel. This current pixel has four specifically located neighbors, and these neighbors are marked with respective numeric "values" which are seen to total to the number sixteen. This number total (sixteen) for filter 28 is also referred to herein as a defined distribution-weight totality number. These individual position values represent the proportions, relative to the total number sixteen, of a given R, G, or B error value which each of the respective actually positionally associated pixels in the current image R, G, B data file will "receive" via error diffusion according to the designed operation of the filter. Thus, for the example R error value of 32 mentioned above, $7/16$ (or 14) will go the neighbor of the current pixel which sits relatively in the pixel position marked [7] in the filter illustration of FIG. 2. Similarly $3/16$ (or 6), $5/16$ (or 10) and $1/16$ (or 2) will be distributed to those current-pixel neighbors which sit in the relative positions marked [3], [5] and [1], respectively, in FIG. 2.

In a non-invention-modified, conventional practice, the numeric distributions just described will, by the normal and unchanged behavior associated with filter 28, be as just described, and will be "presented" by that filter to buffer 26 appropriately so as to accomplish the intended error diffusion. And, with that kind of conventional behavior occurring, obviously the whole numeric value, or the entire defined distribution-weight totality number, of the calculated error (32 in the example being discussed) will be diffusion-distributed.

Figure 2:
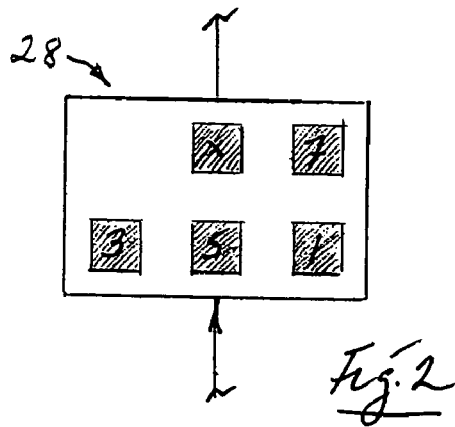
FIGS. 2, 3, and 4 illustrate, respectively, a Floyd and Steinberg error diffusion filter, a Jarvis, Judice and Ninke error diffusion filter, and a Stucki error diffusion filter. These views picture filters which may be employed advantageously at the block location which is labeled "Error Filter" in FIG. 1.
Figure 3:
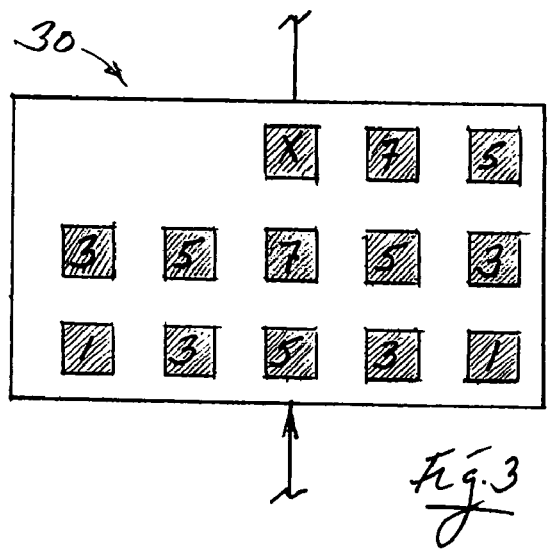
Figure 4:
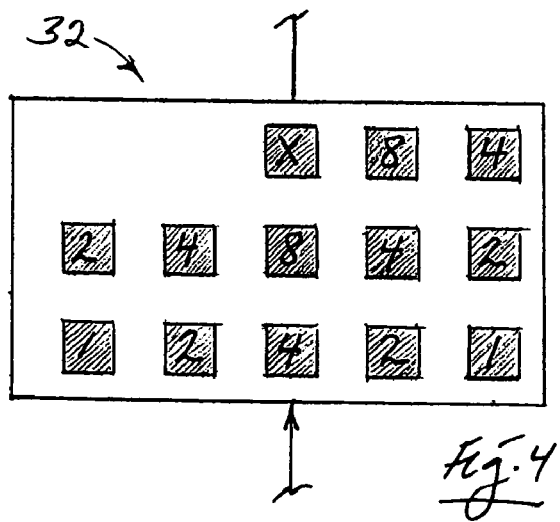

FIGS. 3 and 4 represent, at 30, 32, respectively, two other conventional error diffusion filters—named earlier herein. From the description which has just been presented for the normal operation of filter 28 shown in FIG. 2, the normal operations of the filters designated 30, 32 will be apparent.

Each of filters 28, 30, 32 is characterized with one (filter 28) or two (filters 30, 32) low-significance distribution positions which are those particular positions marked with the number [1]. The reason for pointing out those positions will become evident very shortly.

Block 24, marked "Reduce", in FIG. 1 represents the presence in methodology 10 of a central feature of the present invention. This functional block which, for convenience of illustration, is shown placed in a communication path between error filter block 22 and error buffer 26, should be thought of as possessing an operative connection linked to the filter which occupies block 22. This connection is represented in FIG. 1 by dash-dot line 34.

The cooperative interaction which takes place between the filter in block 22 and "Reduce" block 24 results in less than the whole amount of the full calculated diffusion error for each R, G, B component of each pixel to be presented to, for use by, error buffer 26. This less than the whole amount is also referred to herein as the chosen distribution-weight totality number. As has been mentioned, the preferred reduction is $1/16$, and applying this reduction to the example R total error amount of 32 translates into a numeric reduction of 2, and thus from 32 (the defined distribution-weight totality number) to 30 (the lesser, chosen distribution-weight totality number). When the filter in block 22 takes the form of the Lloyd and Steinberg filter illustrated in FIG. 2, this reduction is preferably effected by "ignoring" the otherwise "normal" distribution of $1/16$th of the total error to the current pixel's neighboring pixel which sits relatively in the pattern position marked [1] in the filter. In other words, this filter will effectively be operated as if the number [0] were present in the location conventionally marked [1] (as seen in FIG. 2). One will note that this preferred position in the Floyd and Steinberg filter is the single lowest-significance pixel position.

Reduction of diffusible error in accordance with this practice of the invention has been shown, especially (a) where filtering is performed by a Lloyd and Steinberg filter, (b) where the reduction is 1/16th, and (c) where application of the reduction takes place relative to the low-significance pixel pattern position just described, to eliminate, substantially completely, color bleed as a problem in all practices of color error diffusion, including the illustrated practice of color vector error diffusion.

From this description regarding the preferred manner of practicing the invention, reductions implemented using other diffusion filters, such as the two shown in FIGS. 3 and 4, will be clearly apparent to those generally skilled in the art. In some cases, achieving exactly the preferred 1/16th reduction may not be possible, but getting close to this preferred reduction may be closely approachable. For example, when using a Jarvis, Judice and Ninke filter, to achieve an exact 1/16th reduction effectively requires reducing 3/48ths of the total diffusion error based upon the design of that filter. One could, of course, choose to reduce from [3] to [0] the proportionate amount normally distributed by that filter to any one of the four pixel pattern positions marked [3] in the filter, or one could reduce from [1] to [0] the proportionate amounts normally distributed to the two pixel pattern positions marked [1] in the filter, and in addition, also make a [3] to [2] reduction in one of the marked [3] positions. Other pattern-place reductions might also be employed if desired.

With a Stucki-type filter, a 1/16th exact reduction is only "approachable", but effective use of this kind of filter, in the context of also applying the invention, can certainly be made.

The proposed invention thus can be seen and understood to offer, with great simplicity and practicality, an elegant solution to the problem of color bleeding in the kinds of color processing settings described above. The color bleeding issues which attach so frequently to various color image processing practices, and especially to those where color vector error diffusion is employed, are essentially substantially eliminated by the very simple approach of error distribution reduction as explained. It is understood that variations and modifications may be made, and indeed some have been suggested herein, without departing from the spirit of the invention.

I claim:

1. An error distribution reduction method for controlling color bleed in relation to a system-invoked halftone color-image process which involves the practice of error diffusion in the context of a fixed-values output color palette, said method comprising selecting a location in the system which is downstream therein relative both to where such error diffusion takes place, and to the location of the mentioned fixed values output color palette, at that selected location, performing diffusion-accumulated error calculation, at another location in the system which is downstream from where said performing takes place, applying error filtering to define a numerically weighted pixel-neighbor distribution pattern for such calculated accumulated error, where the numbers associated with that pattern add to a defined distribution-weight totality number, and then, using an error distribution reduction number which is independent of error diffusion and filtering, preparing, for use in a next-pixel error-diffusion event, a chosen distribution-weight totality number which is less than the defined distribution-weight totality number, said preparing being performed by a predetermined numeric reduction in the distributable error which nominally results from the step of applying error filtering.

2. The method of claim 1, wherein the mentioned chosen distribution-weight totality number is 15/16 of the mentioned defined distribution-weight totality number.

3. The method of claim 1, wherein said applying is done using a Floyd and Steinberg error filter.

4. The method of claim 3, wherein the mentioned chosen distribution-weight totality number is 15/16 of the mentioned defined distribution-weight totality number.

5. The method of claim 1, wherein said applying is done using an error filter which is one of a (1) Floyd and Steinberg filter, (2) a Jarvis, Judice and Ninke filer, and (3) a Stucki filter.

6. The method of claim 1, wherein color error diffusion takes the form of vector error diffusion.

7. The method of claim 6, wherein said applying is done using an error filter which is one of a (1) Floyd and Steinberg filter, (2) a Jarvis, Judice and Ninke filter, and (3) a Stucki filter.

8. The method of claim 6, wherein the mentioned chosen distribution-weight totality number is 15/16 of the mentioned defined distribution-weight totality number.

9. The method of claim 6, wherein said applying is done using a Floyd and Steinberg error filter.

10. The method of claim 9, wherein the mentioned chosen distribution-weight totality number is 15/16 of the mentioned defined distribution-weight totality number.

* * * * *